United States Patent
Nagai et al.

(10) Patent No.: US 7,629,876 B2
(45) Date of Patent: Dec. 8, 2009

(54) WIRELESS KEY AND DOOR REMOTE CONTROL SYSTEM

(75) Inventors: Nobuyoshi Nagai, Kariya (JP); Mitsugi Ootsuka, Kariya (JP)

(73) Assignee: Denso Corporation, Kariya (JP)

( * ) Notice: Subject to any disclaimer, the term of this patent is extended or adjusted under 35 U.S.C. 154(b) by 335 days.

(21) Appl. No.: 11/878,530

(22) Filed: Jul. 25, 2007

(65) Prior Publication Data

US 2008/0048846 A1 Feb. 28, 2008

(30) Foreign Application Priority Data

Aug. 21, 2006 (JP) .............................. 2006-224231

(51) Int. Cl.
*B60R 25/10* (2006.01)
(52) U.S. Cl. ............................ 340/426.28; 340/426.13; 340/539.3
(58) Field of Classification Search ............ 340/426.13, 340/426.16, 426.17, 426.28, 539.3, 5.2, 5.61, 340/5.62, 5.72, 825.69; 180/287; 307/9.1, 307/10.1, 10.5
See application file for complete search history.

(56) References Cited

U.S. PATENT DOCUMENTS

| 5,627,529 | A  | * | 5/1997  | Duckworth et al. | ..... 340/825.69 |
| 5,905,445 | A  | * | 5/1999  | Gurney et al.    | .............. 340/5.72 |
| 6,924,735 | B2 | * | 8/2005  | Ueda et al.      | ............. 340/426.28 |
| 7,034,657 | B2 | * | 4/2006  | Ueda et al.      | .................. 340/5.62 |
| 7,292,137 | B2 | * | 11/2007 | Gilbert et al.   | ............ 340/426.3 |
| 2001/0028297 | A1 | * | 10/2001 | Hara et al. | .................. 340/5.62 |

FOREIGN PATENT DOCUMENTS

| JP | 08-162996   | 6/1996 |
| JP | 2005-256472 | 9/2005 |
| JP | 2005-264660 | 9/2005 |

* cited by examiner

*Primary Examiner*—Van T. Trieu
(74) *Attorney, Agent, or Firm*—Nixon & Vanderhye, PC

(57) ABSTRACT

A wireless key includes a receiver circuit that operates with a built-in battery, and receives a polling radio wave for wireless key search and authentication from a vehicle, and a transmitter circuit that transmits a lock operation radio wave to a door based on the manipulation on a manipulation device. The wireless key is capable of changing over operation mode between a power saving mode that permits the operation of transmitting the lock operation radio wave by the transmitter circuit and stops the operation of receiving the polling radio wave by the receiving circuit, and a full power mode that permits the operation of transmitting the lock operation radio wave by the transmitter circuit and continues the reception by the receiver circuit.

18 Claims, 5 Drawing Sheets

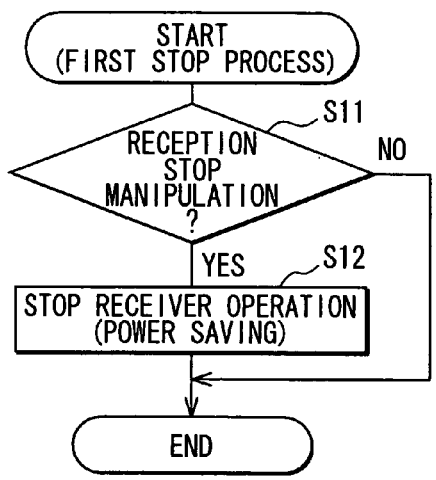
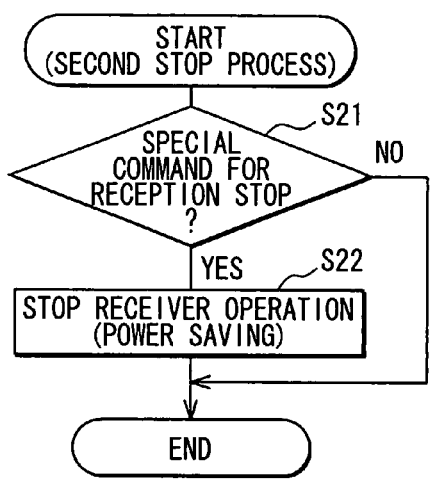
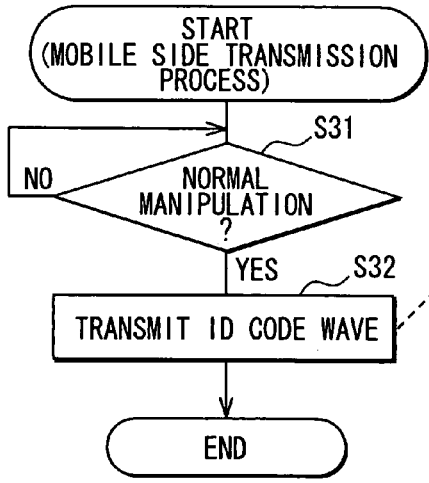
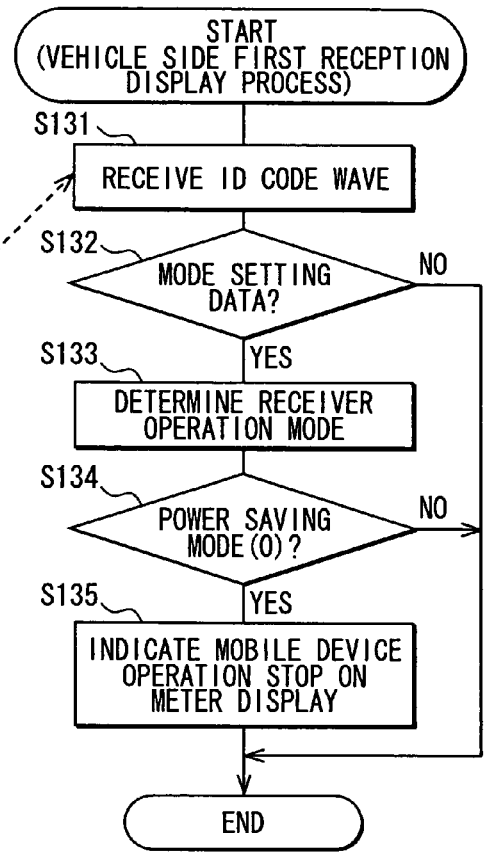

WIRELESS KEY AND DOOR REMOTE CONTROL SYSTEM

CROSS REFERENCE TO RELATED APPLICATION

This application is based on and incorporates herein by reference Japanese Patent Application No. 2006-224231 filed on Aug. 21, 2006.

FIELD OF THE INVENTION

The present invention relates to a wireless key and a door remote control system having the wireless key for remote-controlling locking and unlocking of a door.

BACKGROUND OF THE INVENTION

In recent years, a large number of vehicles are equipped with a vehicle door remote locking and unlocking control system. The vehicle door remote locking and unlocking control system conducts wireless communication between a vehicle wireless key (electronic wireless key: mobile device) which is carried by a user (driver) and a vehicle electronic control unit (ECU) to lock or unlock a door. This system is known as a smart key system (e.g., JP 2005-264660A).

The smart key system periodically polls the wireless key through the wireless communication from an in-vehicle device, so that the wireless key transmits a signal such as an ID code to the in-vehicle device in response to the polling, to thereby authenticate a regular user.

In this smart key system, the wireless key needs to be held in a reception standby state in such a manner that a receiver circuit of the wireless key can always receive periodic polling signals from the in-vehicle device. A power supply of the receiver circuit is normally provided by a built-in dry battery, and hence the built-in battery is liable to run down easily because of always holding the reception standby state. For example, when a vehicle is placed in storage for a long period of time in shipment, or shipping is continued several days, it is understood that polling of the wireless key is not executed for a long period of time. However, because the reception standby state continues in that state, there is the possibility that a battery lifetime of the wireless key ends unexpectedly early after the vehicle has been delivered to the user, and the wireless key cannot be used. Also, when the receiver circuit malfunctions due to a noise of an electric appliance, the battery consumption is further accelerated because the power consumption at the time of the reception is large.

The above situation is similarly applicable to a spare wireless key that is delivered to the user as a spare key. That is, although the spare wireless key is normally carried by the user but kept at home, and is hardly used, a receiver circuit of the spare wireless key is held in the reception standby state where the battery gradually lose power. Also, malfunction occurs due to noises. Under the circumstances, there is a case in which the battery power has been exhausted when the power is actually required.

The power consumption of the wireless key that is used by a normal user is larger at the time of getting on or off the vehicle because of a polling response. However, a period of time required for the polling response communication at the time of getting on or off the vehicle and the number of times of the polling response communication per day are limited. As a result, most of the battery power is consumed in the reception standby state in the case of the constantly used wireless key. Accordingly, when the constantly used wireless key and the spare key are delivered to the user at the same time, there are many cases in which the battery power of the spare wireless key is naturally nearly exhausted when the battery lifetime of the constantly used wireless key is ended. Since the self-discharge of the dry battery is liable to be influenced by the storage temperature, the battery lifetime of the spare wireless key might have been already exhausted depending on the storage state. As a result, when the battery of the constantly used wireless key is exhausted and cannot be used, the battery of the spare wireless key is also exhausted with the result that a role as "spare" is not exerted.

The similar problem will also arise if a similar wireless key is applied to a door remote locking and unlocking control system for various subject bodies such as houses and buildings.

SUMMARY OF THE INVENTION

The present invention has therefore an object to provide a wireless key that is capable of preventing an unnecessary reception standby state and also is capable of effectively utilizing the lifetime of a built-in battery, and a door remote locking and unlocking control system having the wireless key.

According to one aspect, a wireless key comprises a built-in battery, a polling radio wave receiver circuit, a lock/unlock instruction radio wave transmitter circuit, a manipulation device and a control circuit. The polling radio wave receiver circuit operates with the built-in battery to receive a polling radio wave for wireless key search and authentication from a subject body to be controlled. The lock/unlock instruction radio wave transmitter circuit transmits a lock/unlock instruction radio wave to instruct locking/unlocking of a door of the subject body. The manipulation device gives a trigger of transmission of the lock/unlock instruction radio wave to the lock/unlock instruction radio wave transmitter circuit. The control circuit has mode changeover means for changing over an operation mode of the polling radio wave receiver circuit and the lock/unlock instruction radio wave transmitter circuit between a power saving mode and a full power mode. The power saving mode permits transmission of the lock/unlock instruction radio wave by the lock/unlock instruction radio wave transmitter circuit and stops reception of the polling radio wave by the polling radio wave receiver circuit. The full power mode permits the transmission of the lock/unlock instruction radio wave by the lock/unlock instruction radio wave transmitter circuit and continues the reception of the polling radio wave by the polling radio wave receiver circuit.

According to another aspect, the wireless key is used as a part of a door locking/unlocking remote control system that includes an operation mode setting information receiver circuit and a notifying unit. The operation mode setting information receiver circuit is disposed in a subject body such as a vehicle for receiving the operation mode setting information from the wireless key. The operation mode notifying unit notifies the setting state of the operation mode by the wireless key based on the received operation mode setting information.

BRIEF DESCRIPTION OF THE DRAWINGS

The above and other objects, features and advantages will become more apparent from the following detailed description made with reference to the accompanying drawings. In the drawings:

FIG. 4 is a flowchart showing processing of a first mobile device side receiver circuit;

FIG. 5 is a flowchart showing processing of a second mobile device side receiver circuit;

FIG. 6 is a flowchart showing processing of the first mobile device receiving state display process;

DETAILED DESCRIPTION OF THE PREFERRED EMBODIMENTS

The present invention will be described in detail with reference to an embodiment, which is directed to a door remote locking and unlocking control system for a vehicle, which is one example of a subject body to be controlled.

Figure 1:
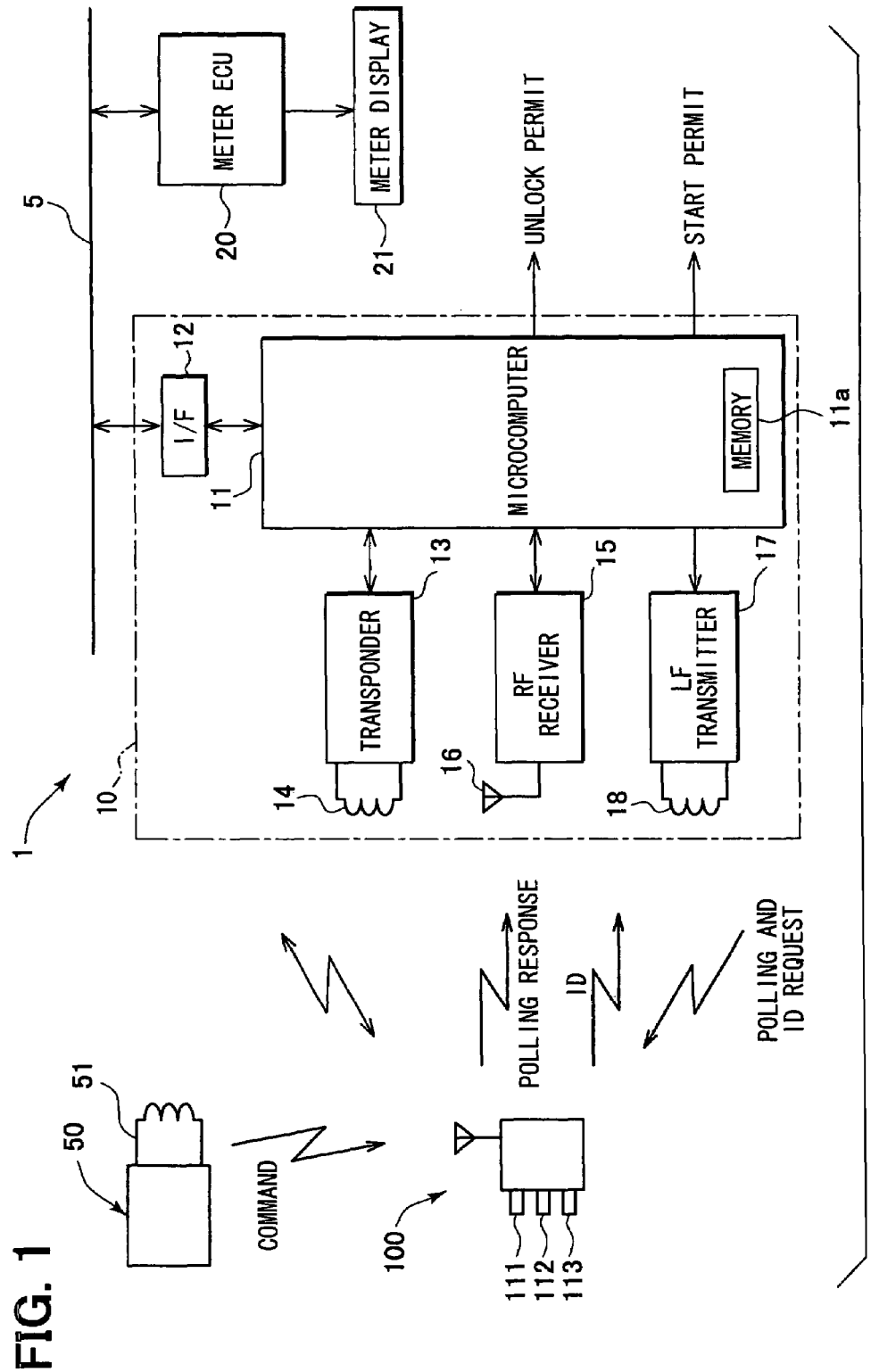
FIG. 1 is a block diagram showing a vehicle door remote locking and unlocking control system according to an embodiment of the present invention.

Referring first to FIG. 1, a vehicle door remote locking and unlocking control system 1 includes a vehicle wireless key (mobile device) 100 that is carried by a user of a vehicle, and an electronic control unit (ECU) 10 that is mounted in the vehicle. The control unit 10 refers to ID information through a wireless communication with the mobile device 100, and locks or unlocks doors of the vehicle and conducts the start control of an engine based on the reference results. Also, it is possible to lock or unlock the doors of the vehicle due to manipulation of manipulation units 111, 112 and 113 that are disposed in the mobile device 100 as a manipulation device.

The control unit 10 has a microcomputer 11 that mainly conducts hardware control. The microcomputer 11 is connected with a LF (low frequency) transmitter circuit 17 as a transmission analog front end portion which transmits LF communication waves toward a predetermined vehicle exterior area and a LF coil antenna 18 that is connected to the LF transmitter circuit 17. The microcomputer 11 is also connected with a RF (radio frequency) receiver circuit 15 as a receiver analog front end portion that receives RF communication waves and a RF antenna 16 that is connected to the RF receiver circuit 15. The microcomputer 11 is further connected with a transponder transceiver circuit 13 and a LF coil antenna 14 that is connected to the transponder transceiver circuit 13, respectively.

The control unit 10 is connected to a serial communication bus 5 through a communication interface 12 so as to enable a communication with other control units (ECU). The control unit 10 is further connected to at least a meter ECU 20 that conducts display control of a meter display (indicator) 21, so as to display the receiving state of a receiver circuit of the mobile device 100 which will be described later in a predetermined display area of the meter display 21.

Figure 3:
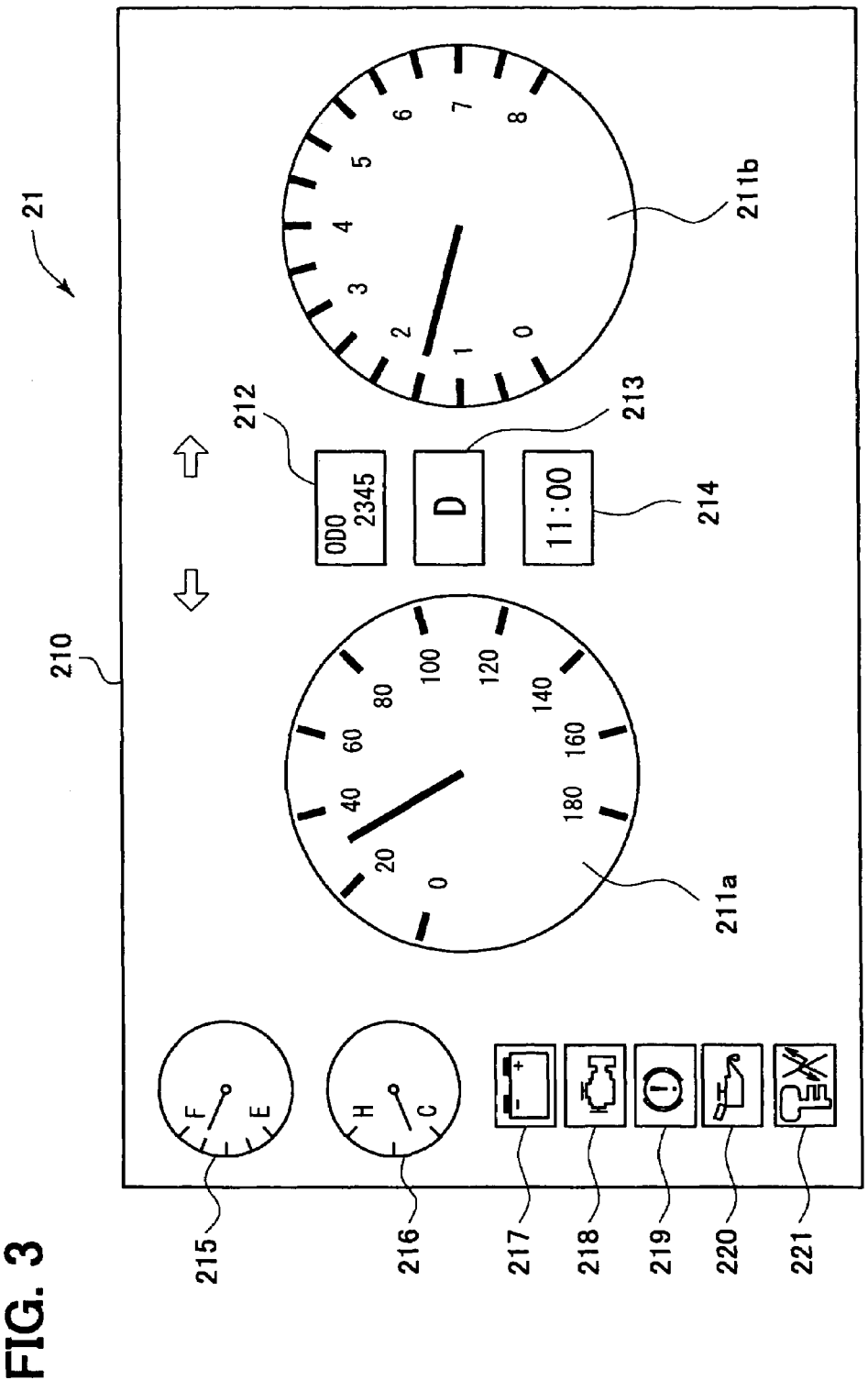
FIG. 3 is a diagram showing an example of a meter display.

As shown in FIG. 3, the meter display 21 is made up of a display device including color liquid crystal and backlight, and indicates various information such as a speed meter 211a, a tachometer 211b, an ODO/TRIP meter 212, a shift position 213, and a clock 214. Also, the meter display 21 can be so configured as to indicate an external temperature, an average mileage, a navigation map, or guide information. The display device that constitutes a display portion of the meter display 21 can be formed of, for example, an EL, a VFD, a CRT, an SED, or a plasma display. Also, a fuel level meter 215 and a water temperature meter 216 are disposed at a side of the display, and their pointers allow the respective states of the fuel level and the water temperature to be indicated a driver. Also, warning indicator lights are made up of lights 217 to 221 such as an oil pressure warning light or a brake warning light, and the driver is warned by turning on or off the lights. The warning indicator lights include a mobile device reception indicator 221 that indicates whether the LF receiver circuit 104 of the mobile device 100 which will be described later is in a reception permissible state (full power mode) or in a reception stop state (power saving mode).

Figure 2:
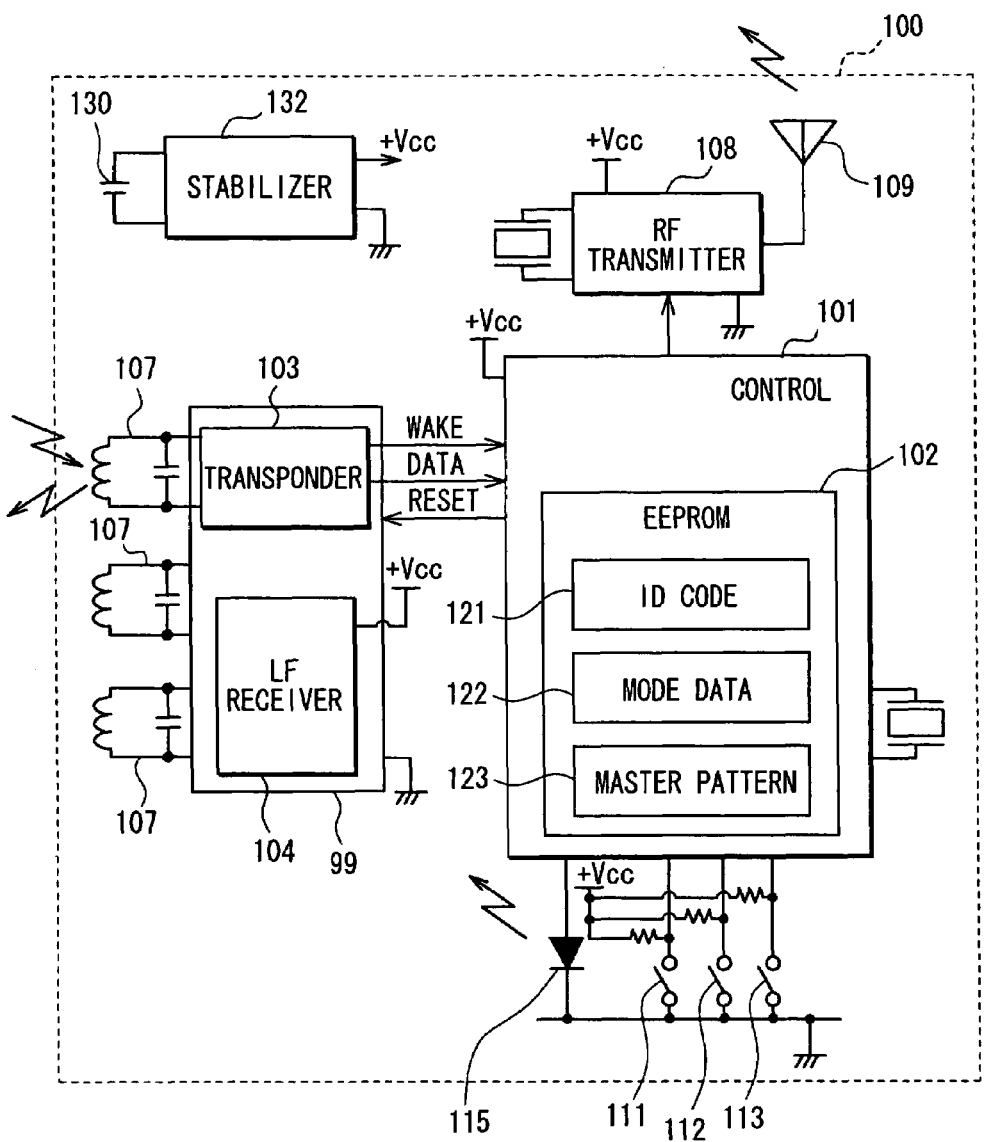
FIG. 2 is a block diagram showing a vehicle wireless key according to the embodiment of the present invention.

As shown in FIG. 2, the mobile device 100 includes a control circuit (control IC) 101 that is mainly made up of microcomputer hardware. The control circuit 101 is connected with a LF analog front end portion 99 that is made up of a LF receiver circuit (polling radio wave receiver circuit) 104 that receives a LF communication radio wave from the LF transmitter circuit 17 of the vehicle side and a transponder transceiver circuit (transponder circuit) 103. The control circuit 101 is also connected with a RF transmitter circuit (lock and unlock instruction radio wave transmitter circuit) 108 that transmits a RF communication radio wave to the receiver circuit 15 of the vehicle side. The LF analog front end portion 99 is connected with a LF coil antenna 107 that is shared by the transponder transceiver circuit and the LF receiver circuit 104. In this example, in order to improve the receiver sensitivity in each of the directions, there are disposed plural antenna coils with respective coil axes being directed in different directions from one another. Also, the RF transmitter circuit 108 is connected with a RF antenna 109. The LF coil antenna 107 is constructed as a resonance antenna together with a capacitor that conducts parallel resonant coupling with the LF coil antenna 107.

A driving power supply of the mobile device 100 is a built-in dry battery (built-in battery) 130, and supplies a supply voltage +Vcc to the control circuit 101, the RF transmitter circuit 108, and the LF receiver circuit 104 through a voltage stabilizer (regulator) circuit 132. On the other hand, as well known, the transponder transceiver circuit 103 is excited due to an induced electromotive force developed in the receiver antenna upon receiving the receiver radio waves from the vehicle side. Thus, the transponder transceiver circuit 103 is constructed as a passive circuit that is isolated from the battery power.

The control circuit 101 includes plural manipulation units 111, 112 and 113 for remotely instructing the locking/unlocking of the doors of the vehicle, and an LED 115 that constitutes an indicator. The vehicle wireless key is so configured as to transmit communication signals including an ID code signal for ID authentication and control signals concerning the locking/unlocking of the door, the engine start, and the signal reception of the mobile device 100 to the vehicle as radio waves wirelessly. Each of the manipulation units 111, 112 and 113 is constructed by an alternate type SPST switch so as to discriminate an input conducted by patterned manipulation which will be described later. An input voltage to the control circuit 101 is changed in a binary fashion due to the open/close operation conducted by the manipulation, respectively. In the mobile device 100, the circuit elements are housed within a resin casing that is formed in a substantially rectangular solid, and the manipulation units 111, 112 and 113 can be manipulated on the casing.

The control circuit 101 is mainly made up of microcomputer hardware, and has an EEPROM 102 that is a nonvolatile memory. The EEPROM 102 includes an ID code storage unit 121 that stores an ID code unique to the mobile device 100, an operation mode setting data storage unit (operation mode setting information storage unit) 122 that rewritably stores operation mode setting data indicative of the operation mode setting contents of the LF receiver circuit 104 (operation mode setting information is formed as a bit flag for discriminating the full power mode "1" and the power saving mode "0" in this embodiment), and a master pattern storage unit 123 in which the master patterns concerning the patterned manipulation for the above mode changeover with respect to the manipulation units 111, 112 and 113 are stored.

The manipulation units 111, 112 and 113 are used as the operation switches for the locking/unlocking of the door lock mechanism or opening the trunk (luggage door). In this embodiment, there are provided those three independent manipulation units 111, 112 and 113 for the locking and unlocking of the door lock mechanism, and opening the trunk. Alternatively, the manipulation units for the locking and unlocking of the door lock mechanism can be shared, or one manipulation unit can be shared with all of those three operation.

The manipulation units 111, 112 and 113 conduct the operation corresponding to the door lock mechanism (or the trunk lock mechanism) by conducting the normal operation in which the manipulation/release is conducted only once. Also, those manipulation units 111, 112 and 113 are used as the manipulation unit for the mode changeover. When the mode changeover operation that is set to be larger in the operation load than the normal operation is added to at least any one of the manipulation units 111, 112 and 113, the mode changeover of from the full power mode to the power saving mode, or from the power saving mode to the full power mode is implemented. The manipulation units that are used at the time of shifting to the power saving mode and at the time of shifting to the full power mode can be set to be the same with each other, or can be made different from each other. For example, when predetermined patterned manipulations in which pulses of the manipulation/release are combined in plurality are set as the mode changeover operation, the following specific examples can be proposed.

(1) The same manipulation pattern is allocated to the manipulation units different from each other (for example, for door locking and for door unlocking), and one manipulation is for a shift to the power saving mode, and the other manipulation is for a shift to the full power mode. For example, the manipulation/release operation is continuously conducted three times. Since the operation contents are the same between the shift to the power saving mode and the shift to the full power mode, it is advantageous in that the manipulation pattern will not be forgotten.

(2) In the case (1), the operation contents are made different between the shift to the power saving mode and the shift to the full power mode. For example, the operation of the manipulation/release is continuously conducted twice at the time of the shift to the power saving mode, and the operation of the manipulation/release is continuously conducted three times at the time of the shift to the full power mode. Although the operation procedure is slightly complicated as compared with the case (1), the manipulation device used for the shift to the power saving mode and the shift to the full power mode is fixed to one, which is relatively understandable. It is still hard to generate an unpreferable mode changeover that is caused by malfunction.

(3) The manipulation pattern composed of plural manipulation/release operations that use at least two of the plural manipulation units 111, 112 and 113 in a given order is so set as to be conducted by those plural manipulation units and the operation contents are the same between the shift to the power saving mode and the shift to the full power mode. For example, one manipulation operation is conducted in each of the manipulation units in the arranged order of the manipulation units 111, 112 and 113. Since the operation contents are the same between the shift to the power saving mode and the shift to the full power mode, it is advantageous in that it will not be forgotten.

(4) In the case (3), the operation contents are made different between the shift to the power saving mode and the shift to the full power mode. For example, at the time of the shift to the power saving mode, one manipulation operation is conducted in each of the manipulation units in the arranged order of the manipulation units 111, 112 and 113. At the time of the shift to the full power mode, one manipulation operation is conducted in each of the manipulation units in the arranged order of the manipulation units 113, 112, and 111. A trouble that the unpreferable mode changeover occurs due to the malfunction can be most effectively prevented.

In the control circuit 101, in order to discriminate the inputs of the normal operation and the mode changeover operation from each other, after the initial manipulation/release operation has been conducted, it is determined whether another manipulation/release operation is conducted or not, after waiting for a given period of time. In this case, it is determined that the operation is the normal operation when there is no other manipulation/release operation. When there is another manipulation/release operation, the operation is checked with the above-mentioned master pattern, and it is determined whether the operation is the mode changeover operation or not. It is possible to distinguish the normal operation and the mode changeover operation according to the duration of the manipulation/release operation, for example, to set the long manipulation operation whose depressing period of time is longer than that of the normal operation as the mode changeover operation.

However, when the door lock is not operative due to the radio wave status in the lock/unlock operation of the door lock which is the normal operation, there is a tendency for the user to depress the manipulation unit for a long period of time. Therefore, in this situation, it is preferable to take the manipulation pattern of the mode changeover operation which is not confused with the above operation into consideration. For example, there can be exemplified a method using the combination (in the above example, the short manipulation operation is continuously conducted three times) of only the short manipulation operation whose manipulation duration is within a threshold period of from 1 second to 5 seconds. The short manipulation operation can be defined as the normal operation, and in this case, the manipulation operation that exceeds the above threshold period becomes the long manipulation operation.

Also, as the user's operation tendency when the door lock is not operative due to the radio wave status, there is proposed that the repetitive manipulation is conducted other than the long manipulation. In this case, it is preferable that the mode changeover operation is defined as the combination pattern that is composed of the following combination of the short manipulation operation and the long manipulation operation.

(5) In both of the shift to the power saving mode and the shift to the full power mode, the mode changeover operation is defined as the same combination pattern such as the short manipulation operation, the short manipulation operation, and the long manipulation pattern in the arranged order.

(6) The mode changeover operation is defined as the combination patterns that are different between the shift to the power saving mode and the shift to the full power mode such that the shift to the power saving mode is the combination pattern of the short manipulation operation, the short manipulation operation, and the long manipulation operation in this order, and the shift to the full power mode is the combination pattern of the long manipulation operation, the short manipulation operation, and the short manipulation operation in this order.

The control circuit 101 notifies that the mode changeover has been completed every time the mode changeover is executed, by the display state of the indicator, that is, the lighting state of the LED 115 under the control. Also, the power saving mode and the full power mode are defined such that the lighting state when the normal operation is conducted therebetween is different from each other.

More specifically, the lighting state of the LED 115 maintains the extinction when the respective manipulation units 111, 112 and 113 do not operate. When the respective manipulation units 111, 112 and 113 normally operate at the time of the power saving mode, the LED 115 turns on only once and then turns off. When the respective manipulation units 111, 112 and 113 normally operate at the time of the power saving mode, the LED 115 turns on twice and then turns off. Also, when the mode changeover operation (the reception stopping operation or the reception restart operation) is conducted, the LED 115 turns on three times and then turns off. As a result, it is possible to visually confirm whether the LF receiver circuit 104 of the mobile device 100 is in the full power mode or the power saving mode, by the LED 115 as with the mobile device reception state indicator 221 of the meter display 21. Also, it is possible to visually confirm whether the reception stop operation has been correctly conducted or not. It is possible that the lighting state of the LED 115 is set to be different between the shift to the power saving mode and the shift to the full power mode at the time of the mode changeover operation (for example, the LED 115 turns on four times and then turns off in the latter).

It is assumed here that this embodiment is applied to a case in which the protocol of the challenge response system is applied between the mobile device 100 and the ECU 10 of the vehicle side. First, in the full power mode, the polling signal is transmitted from the LF coil antenna 18 of the control unit 10 of the vehicle side toward a predetermined vehicle exterior area at each of predetermined time intervals. When the mobile device 100 carried by the user enters the vehicle exterior area, the receiver circuit 104 in the mobile device 100 receives the polling signal through the LF coil antenna 107.

The data frame structure of the polling signal is well known. When a data frame in which the specific information of the mobile device 100 is written in a field that specifies a device to be polled is intermittently sent, and a status including the corresponding specific information is returned from the wireless key side, it is basically determined that there is a polling reply. However, in this embodiment, the polling process is conducted at the following two stages in order to improve the security.

(7) A polling start code (for example, sequence number that is counted up every time transmission is conducted, and the present time, which are hereinafter called "polling signal" narrowly defined in the present specification) that is unrelated to the ID code of the mobile device 100 and changes the contents every time the transmission or reception is conducted is sent from the LF transmitter circuit 17 (LF coil antenna 18). When the mobile device 100 that conforms to the same communication protocol exists within the radio wave arrival range of the LF transmitter circuit 17 (and the LF coil antenna 18), the mobile device 100 receives the polling start code by the LF receiver circuit 104, conducts encrypting operation using predetermined algorithm (encryption using a secret key as well as encryption using a Hash function (for example, CRC calculation) can be conducted, and returns the encryption result to the vehicle side from the RF transmitter circuit 108 (RF antenna 109). The vehicle side receives the encryption result by the RF receiver circuit 15 (RF antenna 16), decrypts the received encrypted code ("polling reply signal" narrowly defined) due to algorithm corresponding to the encrypting operation, and checks the decrypted code with the polling start code that has been sent by the vehicle. When the checking result is acceptable, the LF transmitter circuit 17 returns the ID request signal (which is also a polling signal to the mobile device 100 which is broadly defined) as the status. When the checking result is rejected, the LF transmitter circuit 17 returns an error notification signal as the status.

(8) When the LF transmitter circuit 17 transmits the ID request signal, the mobile device 100 receives the ID request signal by the LF receiver circuit 104, and returns the ID code signal (which is stored in the ID code storage unit 121) that reflects the contents of the ID code unique to the mobile device 100 which is used for an immobilizer authentication at the vehicle side from the RF transmitter circuit 108 (RF antenna 109) to the vehicle side.

The LF modulated wave used in the above polling communication (more specifically, a radio wave resulting from digitally modulating the LF carrier wave with the polling start code or the ID request signal as a base band signal) is the polling radio wave.

The control unit 10 at the vehicle side receives the ID code signal by the RF receiver circuit 15, and inputs the ID code signal to the microcomputer 11. The microcomputer 11 determines whether the ID code that has been received from the mobile device 100 coincides with a master ID code that has been registered in a nonvolatile memory 11a within the microcomputer 11 or not. When the former coincides with the latter, the microcomputer 11 outputs an unlock permit signal to a door lock control unit (not shown). The door lock control unit receives the unlock permit signal, and shifts to a lock/unlock operation standby state that accepts the operation for door locking or unlocking (in the case of no unlock permit signal, the door lock control unit comes to a lock/unlock operation refusal state).

The door locking or unlocking is executed by driving the door lock actuator of the door through the door lock control unit, and the lock/unlock operation that serves as a trigger can be implemented by manually operating any one of the manipulation units 111, 112 and 113 disposed in the mobile device 100, which is to be used to lock or unlock the door. More specifically, a lock/unlock instruction radio wave (specifically, a radio wave resulting from digitally modulating the RF carrier wave with the lock/unlock instruction signal as the base band signal) is output from the RF transmitter circuit 108 through the operation of the manipulation units 111, 112 and 113, and then received by the RF receiver circuit 15 at the vehicle side. With the above operation, the door lock mechanism conducts the lock/unlock operation.

Alternatively, the system can be configured in such a manner that the locking or unlocking can be conducted by touching a touch sensor disposed in the vicinity of a door knob of the vehicle within a given period of time by the user who has the mobile device 100 after the unlock permit signal is output due to the polling in addition to the locking/unlocking due to the operation of the manipulation units 111, 112 and 113. In the latter, the user carries the regular mobile device 100 and merely touches the touch sensor, thereby enabling the door to be unlocked (the door is locked when the user touches the touch sensor in the unlocked state once again).

On the other hand, when the battery 130 of the mobile device 100 is exhausted, the LF receiver circuit 104, the control unit 101 and the RF transceiver circuit 108 which are driven by the battery 130 do not operate. The polling communication processing of the above cases (7) and (8) for the door locking/unlocking is disabled. In this case, the transponder transceiver circuit 103 for the backup is substituted for the communication processing of the cases (7) and (8). In this case, since the radio wave arrival distance of the transponder transceiver circuit at the side of the mobile device 100 is not too large (about 7 to 8 cm at the largest), it is necessary to make the mobile device 100 sufficiently approximate to the transponder transceiver circuit 13 (a vehicle exterior polling type is built in, for example, a door) at the vehicle side. Then, the transponder transceiver circuit 103 for the backup receives a specific command radio wave for backup which is transmitted from the vehicle side, to thereby lock or unlock the door. Alternatively, the remote locking or unlocking of the door (locking or unlocking using the touch sensor at the door side) is not backed up by the transponder transceiver circuit 103, and the locking or unlocking is conducted by a mechanical emergency key at the time of exhausting the electric power of the battery 130 of the mobile device 100.

In this embodiment, even when the mobile device 100 is carried on the vehicle, the mobile device 100 is searched by the LF transmitter circuit 17 for vehicle interior search (in this case, the LF transmitter circuit 17 is disposed together with the LF coil antenna 18 in addition to the vehicle exterior search) through polling, and checked with the ID code. When the checked result indicates an acceptance, an immobilizer (not shown) is unlocked, and an in-vehicle push start button (not shown) is operated while pressing a brake pedal, to thereby start an engine. On the other hand, when the checked result is a rejection, the immobilizer is not unlocked, to thereby disenable the engine start.

On the other hand, when the battery 130 of the mobile device 100 is exhausted, the communication between the transponder transceiver circuits 13 (vehicle side) and 103 (mobile device 100 side) is substituted for the above authentication process. Similarly, in this case, it is necessary to move the mobile device 100 sufficiently close to the transponder transceiver circuit 13 at the vehicle side (for example, the mobile device 100 may be positioned in the vicinity of a driver seat of an instrument panel, a holder for holding the mobile device 100 may be provided). Also, a nonvolatile memory that stores the master ID code therein is incorporated into the transponder transceiver circuit 13.

Alternatively, it is possible that the LF transmitter circuit for the vehicle interior search is omitted, and the communication process for the immobilizer authentication is always conducted by the transponder transceiver circuit 13 of the vehicle side and the transponder transceiver circuit 103 of the mobile device 100).

As described above, in the vehicle door remote locking and unlocking control system 1, the confirmation that the mobile device 100 exists is executed by polling the mobile device 100 from the vehicle side, and the locking and unlocking of the door is conducted by the operation of the manipulation units 111, 112 and 113 at the side of the mobile device 10. Then, for a case where the mobile device 100 is not used for a long period of time (for example, when the mobile device 100 is kept as a spare key), it is possible to change over from the full power mode at which all of the battery driver circuits including the LF receiver circuit 104 operate to the power saving mode at which the RF transmitter circuit 108 that outputs the locking/unlocking instruction radio wave and the control unit 101 operate by the aid of the battery 130, but the LF receiver circuit 104 stops its operation (that is, the LF receiver circuit 104 is not responsive to the polling radio wave). This operation will be described in more detail.

First, a case of changing over from the full power mode to the power saving mode is described. There are two types of methods of stopping the reception of the LF receiver circuit 104 at the mobile device 100 side. In the first method, the reception is stopped by the operation of stopping the reception with respect to the manipulation units 111, 112 and 113. In the second method, the reception is stopped based on the reception of the specific command for stopping the reception which is transmitted from a dedicated tool 50 (FIG. 1).

In the first method, program that executes the first mobile device side receiver circuit stopping process shown in FIG. 4 is executed by the control circuit 101 of the mobile device 100 in the full power mode. First, in step S11 it is determined whether the predetermined reception stopping operation for stopping the reception of the LF receiver circuit 104 is conducted by the manipulation units 111, 112 and 113 or not.

As was already described above, the reception stopping operation is determined as the patterned operation that combines a period of time during which the operating state of the manipulation units 111, 112 and 113 is continued with a period of time during which the operating state is released according to a predetermined pattern. Also, the pattern is composed of the combination of at least two of the manipulation units 111, 112 and 113.

The input signal pattern that occurs together with the operation of the manipulation units 111, 112 and 113 is checked with the master pattern that is stored in the master pattern storage unit 123. When the former coincides with the latter, the mode is shifted to the power saving mode that stops the reception of the LF receiver circuit 104 in step S12. More specifically, the control circuit 101 rewrites the operation mode setting data (bit flag) that is stored in the operation mode setting data storage unit 122 into data corresponding to the power saving mode, and changes over an input voltage level of the instruction signal from the control circuit 101 to a designated port concerning the operation and stop instruction of the LF receiver circuit 104 from "H" (operation enable) to "L" (operation stop) based on the rewritten operation mode setting data. Also, when the input signal pattern does not coincide with the master pattern, this program is terminated, and the full power mode is maintained. The LF receiver circuit 104 is a dedicated IC, and the internal hardware logic related to the operation and stop can be, for example, so configured as to change over a power switch transistor disposed on a power receiving route of a supply voltage Vcc between conduction and non-conduction according to the H/L changeover of the instruction signal.

In the second method, the dedicated tool 50 that stops the reception is used in the LF receiver circuit 104 at the mobile device 100 side. In this case, the program that executes the second mobile side receiver circuit stopping process shown in FIG. 5 is executed by the control circuit 101 in the full power mode.

In the second processing, regular reception stopping operation is conducted on a manipulation unit (not shown) of the dedicated tool 50 (FIG. 1), to thereby transmit a special command signal, which reflects the rewrite contents of the operation mode setting data. This means the reception stop from the LF transmitter unit (and the LF coil antenna 51). Hereinafter, the LF modulated wave for transmitting the command signal is referred to as a special command radio wave.

When the special command radio wave has been received in step S21, the mode is shifted to the power saving mode that stops the operation of the LF receiver circuit 104 in step S22. More specifically, the contents (rewritten operation mode setting data) of the special command that has been received by the LF receiver circuit 104 are transmitted to the control circuit 101 (FIG. 2: DATA). The control circuit 101 rewrites the operation mode setting data (bit flag) that is stored in the operation mode setting data storage unit 122 from "1" corresponding to the full power mode setting to "0" corresponding to the power saving mode, and changes over the input value to the above port that instructs the operation or stop from "H" to "L", according to the received contents (FIG. 2: RESET). In step S21, when the special command radio wave indicative of the reception stop is not received, this program is terminated, and the full power mode is maintained. The special command radio wave for the reception stop which is transmitted by the dedicated tool 50 can be the transponder radio wave. In this case, when the mobile device 100 side receives the special command radio wave for the reception stop by means of the LF coil antenna 107, the reception stop signal is transferred to the control circuit 101 from the transponder transceiver circuit 103, to thereby execute the process of shifting to the power saving mode.

Also, the system according to this embodiment is configured such that a driver is capable of recognizing the operation mode setting state of the LF receiver circuit 104 at the mobile device 100 side. More specifically, the operation mode setting state can be visually recognized by the lighting state of the icon 221 that is displayed on a display screen 210 of the meter display 21 of the vehicle shown in FIG. 3. Also, the operation mode setting state can be also recognized by the lighting pattern of the LED 115 disposed on the mobile device 100. As the above display method, there are two manners described below.

In the first method, when the predetermined operation is conducted in the manipulation units 111, 112 and 113, there is a method of notifying the receiving state of the LF receiver circuit 104. The specific processing is conducted by executing the program for the first vehicle side mobile device receiving state display process shown in FIG. 6 by the microcomputer 11 of the vehicle side, and executing the program for the mobile device side remote keyless entry radio wave transmitting process shown in FIG. 6 by the control circuit 101 of the mobile device 100.

The mobile device side remote keyless entry radio wave transmitting process that is executed at the mobile device 100 side is executed by the control circuit 101 that starts by manipulating the manipulation units 111, 112 and 113. First, in step S31, it is determined whether the manipulation conducted in the manipulation units 111, 112 and 113 is the normal one or not. When the control circuit 101 detects the normal manipulation, the control circuit 101 reads the operation mode setting data that is stored in the operation mode setting data storage unit 122 of the EEPROM 102, writes the ID code of the mobile device 100 and the operation mode setting data in the respective predetermined fields of the transmission frame, and transmits the written ID code and data from the RF transmitter circuit 108 in step S32.

At the vehicle side, the RF receiver circuit 15 receives the transmitted data (step S131), and determines whether the operation mode setting data is included in the received data or not (step S132). When the operation mode setting data is not included in the received data, this program is terminated. On the other hand, when the operation mode setting data is included in the received data, the operation mode, of the LF receiver circuit 104 is determined according to the contents of the operation mode setting data in step S133. When the contents are "0" in step S134, the power saving mode (operation stop) is being set, and the operation is advanced to step S135 in which the LF receiver circuit 104 at the mobile device 100 side notifies the driver that the polling reception is under suspension. More specifically, the icon 221 of the meter display 21 is made in the lighting state, the LED 115 of the mobile device 100 is lighted in a predetermined lighting pattern (which is different from other lighting patterns, and the LED 115 is lighted continuously twice in this embodiment), and this program is terminated. Also, when the contents are "1" in step S134, the full power mode is being set, and this program is terminated without conducting an annunciation. The program is repetitively executed in a given cycle.

Next, the second method will be described. In this method, transponder communication which does not require the batter is used. When the mobile device 100 receives an operation mode setting data request signal from the vehicle side as a transponder radio wave, the mobile device 100 notifies the operation state of the LF receiver circuit 104 of the mobile device 100. In this case, in order to receive the operation mode setting data request signal as the transponder radio wave, it is necessary to bring the mobile device 100 close to the radio wave arrival area (for example, about 7 to 8 cm with respect to the LF coil antenna 14 at the maximum) of the transponder transceiver circuit 13.

Figure 7:
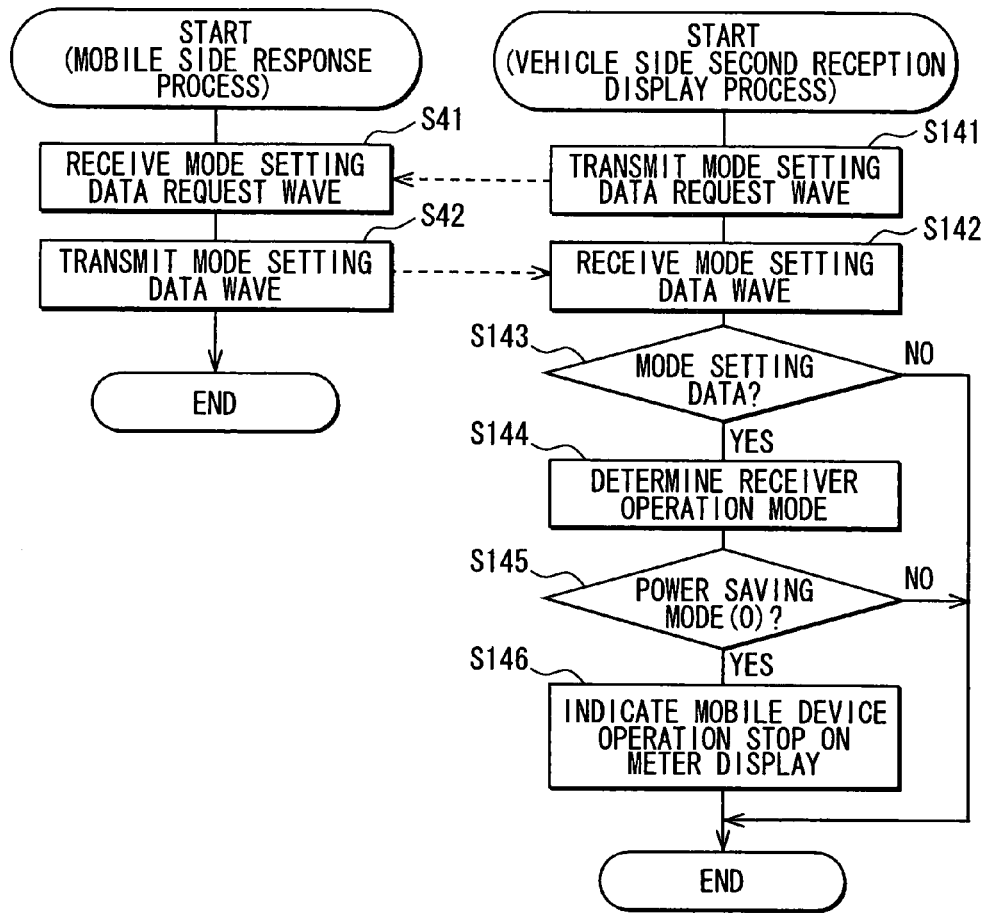
FIG. 7 is a flowchart showing processing of the second mobile device receiving state display process.

In this case, the specific processing at the vehicle side and the mobile device 100 side is conducted by executing the program of the second vehicle side mobile device receiving state display process shown in FIG. 7 by the microcomputer 11 at the vehicle side, and executing the program for the mobile device side receiving state response processing shown in FIG. 7 by the control circuit 101 of the mobile device 100. First, in step S141, the vehicle side transmits the operation mode setting data request signal for the operation mode setting data transmission from the LF coil antenna 14 of the transponder transceiver circuit 13 as the transponder radio wave. The transmission timing can be arbitrarily determined, but it is preferable to transmit the operation mode setting data request signal in a state where the driver is within the vehicle interior, or in a state where it is estimated that the drive enters the vehicle interior, taking the fact that the operation mode of the mobile device 100 is indicated on the meter display 21 within the vehicle interior into consideration. In this embodiment, the vehicle side transmits the operation mode setting data request signal as the operation mode setting data request radio wave, which is triggered when a start button that starts the engine is turned on.

In step S41, the operation mode setting data request radio wave is received by the transponder transceiver circuit 103 of the mobile device 100 (the reception can be conducted regardless of the operation state of the LF receiver circuit 104). The transponder transceiver circuit 103 is excited by receiving the operation mode setting data request radio wave, and inputs the operation mode setting data request signal (WAKE and DATA in FIG. 2) to the control circuit 101 with an induced electromotive force developed in the LF antenna coil 107 as a power supply. Upon receiving the operation mode setting data request signal, the control circuit 101 reads the operation mode setting data that has been stored in the operation mode setting data storage unit 122. Subsequently, in step S42, the transponder transceiver circuit 103 transmits the read operation mode setting data to the vehicle side as radio waves (operation mode setting data radio wave). The program that is executed at the mobile device 100 side is terminated in this situation.

The vehicle side receives the operation mode setting data radio wave by the transponder transceiver circuit 13 in step S142. The vehicle side then determines whether the operation mode setting data of the LF receiver circuit 104 at the mobile device 100 side is included in the receiving contents or not in step S143. When the former is not included in the latter, the program at the vehicle side is terminated. On the other hand, when the former is included in the latter, the control is advanced to step S144.

In step S144, the contents of the operation mode setting data is analyzed. When the analysis contents are "0" in step S145, the operation mode is the power saving mode (operation stop). Then, the control is advanced to step S146, and the vehicle side notifies the driver that the LF receiver circuit 104 is in the operation stop state. The notifying method is the same with the above first method. After notification, this program is terminated. When the analysis contents are "1" in step S145, the operation mode is the full power mode, and this program is terminated without particularly conducting the notifying process. The program that is executed at the vehicle side is repeated in a given cycle even after the program has been terminated.

As described above, in this embodiment, the reception of the LF receiver circuit 104 in the mobile device 100 can be changed over from the full power mode that permits the reception to the power saving mode that stops the reception. Also, when the driver drives the vehicle, the operation state of the LF receiver circuit 104 is indicated on the meter display 21 of the vehicle or the LED 105 of the mobile device 100, thereby making it possible that the drive recognizes the operation state. Then, when the mobile device 100 is in the power saving mode, it is possible that the driver changes over from the power saving mode to the full power mode as required.

Figure 8:
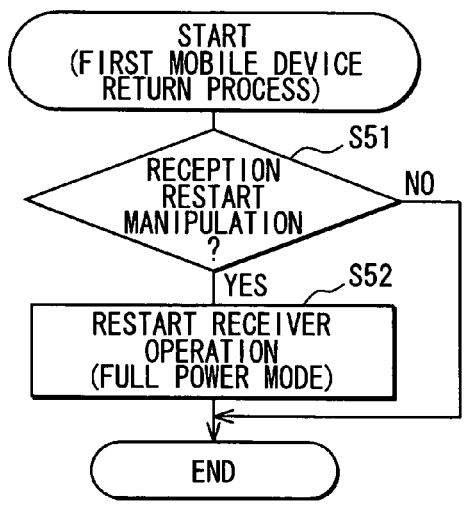
FIG. 8 is a flowchart showing processing of a first mobile device side receiver circuit return process.

FIG. 8 shows the first method of a process for changing over the mobile device 100 from the power saving mode to the full power mode to restart the reception of the LF receiver circuit 104 (the mobile device side receiver circuit return process). First, in step S51, it is determined whether the predetermined reception restarting manipulation for restarting the operation of the LF receiver circuit 104 is conducted on the manipulation units 111, 112 and 113 or not. As was already described above, like the above reception stopping operation, the reception restarting manipulation is determined as the patterned manipulation that combines a period of time during which the operating state of the manipulation units 111, 112 and 113 is continued with a period of time during which the operating state is released according to a predetermined pattern. Also, the pattern is composed of at least two of the manipulation units 111, 112 and 113. The reception restarting manipulation can be determined as the same manipulation pattern as that of the reception stopping manipulation. As a result, the user merely leans a series of manipulation.

The input signal pattern that occurs together with the manipulation of the manipulation units 111, 112 and 113 is checked with the master pattern that is stored in the master pattern storage unit 123. When the former coincides with the latter, the process of returning to the full power mode is executed in step S52. More specifically, the return to the full power mode is conducted in such a manner that the control circuit 101 rewrites the operation mode setting data (bit flag) that has been stored in the operation mode setting data storage unit 122 into data corresponding to the full power mode, and changes over the input voltage level of the instruction signal from the control circuit 101 to a designated port concerning the operation and stop instruction with respect to the LF receiver circuit 104 from "L" (operation stop) to "H" (operation permit) based on the rewritten operation mode setting data. Also, when the input signal pattern does not coincide with the master pattern, this program is terminated, and the power saving mode is continued.

Figure 9:
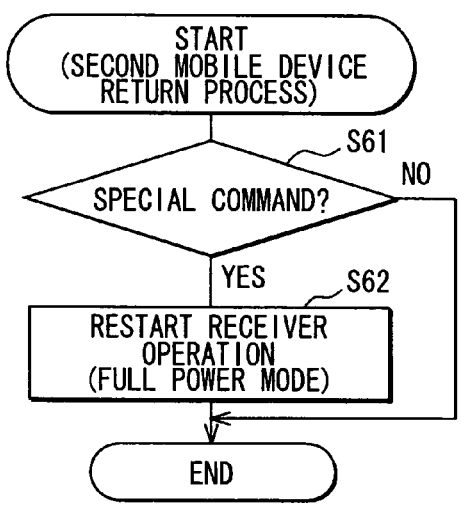
FIG. 9 is a flowchart showing processing of a second mobile device side receiver circuit return process.

Next, the second method will be described. Similarly, the same dedicated tool 50 (FIG. 1) as that used at the time of shifting to the power saving mode is employed. In this case, in the power saving mode, the mobile device side receiver circuit return process shown in FIG. 9 is executed. In the method, program that executes the second mobile device side receiver circuit return process is executed by the control circuit at the mobile device 100 side. This process is executed assuming that the mobile device 100 is in the power saving mode.

In the above processing, regular reception restarting operation is conducted on a manipulation device (not shown) of the dedicated tool 50, to thereby transmit a command signal that means the reception restart from the LF transmitter unit (and the LF coil antenna 51) by the aid of a special command radio wave. In the mobile device 100, in step S61, it is determined whether the special command radio wave for the reception restart is received or not. In this situation, since the LF receiver circuit 104 is stopping operation at the mobile device 100 side, the transponder transceiver circuit 103 receives the special command radio wave. When the reception of the special command radio wave is confirmed in step S61, the transponder transceiver circuit 103 inputs the contents of the received special command (rewritten operation mode setting data) to the control circuit 101 by using the induced electromotive force developed in the LF coil antenna 107 upon receiving the special command radio wave (FIG. 2: WAKE, DATA). The control circuit 101 rewrites the operation mode setting data (bit flag) that is stored in the operation mode setting data storage unit 122 from "0" corresponding to the power saving mode to "1" corresponding to the full power mode, and changes over the input value to the port that instructs the operation or stop from "L" to "H", according to the received contents (FIG. 2: RESET). Thus, the receiver circuit operation is restarted in step S62 at the mobile device 100. When the special command radio wave for the reception restart is not received in step S61, this program is terminated, and the full power mode is continued.

The control circuit 101 at the mobile device 100 side executes the processing shown in FIGS. 4 to 9 to function as the mode changeover means, the operation stop instruction signal output means, the operation restart instruction output means, the operation mode setting information rewrite means, and the operation mode setting information wireless transmission means. Also, the microcomputer 11 at the vehicle side executes the processing shown in FIGS. 6 and 7 to function as the operation mode setting information receiving means and the operation mode notifying means.

The above embodiments may be modified in various ways.

For instance, the transponder transceiver circuit for the master information transmission used for the registration of the authentication master information (ID code) in the vehicle side can be shared as the transponder transceiver circuit (transponder circuit) 103 that receives the reception stop signal in the full power mode as radio waves. Normally, in order to prevent noises, the registration of the authentication master information in the mobile device 100 that is the wireless key and the vehicle side is conducted by proximity communication using the master information transmission transponder transceiver circuit (transponder circuit) of the mobile device 100.

More specifically, the authentication master information is stored in the nonvolatile memory that is disposed in the master information transmission transponder transceiver circuit of the mobile device 100 in advance. Then, the wireless key is brought close to approximate to the vehicle side, and the authentication master information that is stored in the nonvolatile memory of the master information transmission transponder transceiver circuit of the mobile device 100 is transmitted to the vehicle side together with the ID of the master information transmission transponder transceiver circuit in the close state, with shipment. As a result, the authentication master information is registered by the vehicle side that receives the authentication master information. Then, after registration, the authentication master information that has been registered in the vehicle side is transmitted to the mobile device 100 together with the vehicle ID this time. The authentication master information is rewritten in the nonvolatile memory 102 (ID code storage unit 121) of the main control circuit 101 of the mobile device 100, and then registered. When the above configuration is assumed, the above master information transmission transponder transceiver circuit can be shared as the transponder transceiver circuit. As a result, it is possible to suppress an increase in the costs which occurs with the addition of the functions.

Further, the process of changing over to the power saving mode is conducted successive to the process that is executed as a state where the vehicle and the mobile device 100 are made to approximate to each other as in the above registration process, thereby enabling the shift to the power saving mode to be efficiently conducted. Also, when the changeover to the power saving mode is conducted successive to the registration process, it is possible to completely change over the wireless key of the vehicle before shipment to the power saving mode.

Also, in the case of conducting the stop or restart of the LF receiver circuit 104 of the mobile device 100 by the aid of the dedicated tool 50, operation mode notifying means such as an indicator can be disposed at the tool side. With the above configuration, it is possible to confirm the operation mode of the receiver circuit at the tool side.

In addition, the embodiment may be directed to door remote locking and unlocking control systems for various subject bodies, for instance, houses, offices other than vehicles.

What is claimed is:

1. A wireless key comprising:
    a built-in battery as a power supply;
    a polling radio wave receiver circuit that operates with the built-in battery to receive a polling radio wave for wireless key search and authentication from a subject body to be controlled;
    a lock/unlock instruction radio wave transmitter circuit that transmits a lock/unlock instruction radio wave to instruct locking/unlocking of a door of the subject body;
    a manipulation device that gives a trigger of transmission of the lock/unlock instruction radio wave to the lock/unlock instruction radio wave transmitter circuit; and
    a control circuit having mode changeover means for changing over an operation mode of the polling radio wave receiver circuit and the lock/unlock instruction radio wave transmitter circuit between a power saving mode and a full power mode, the power saving mode permitting transmission of the lock/unlock instruction radio wave by the lock/unlock instruction radio wave transmitter circuit and stopping reception of the polling radio wave by the polling radio wave receiver circuit, and the full power mode permitting the transmission of the lock/unlock instruction radio wave by the lock/unlock instruction radio wave transmitter circuit and continuing the reception of the polling radio wave by the polling radio wave receiver circuit.

2. The wireless key according to claim 1, wherein:
    the mode changeover means stops the reception of the polling radio wave receiver circuit, and shifts the operation mode to the power saving mode, when a predetermined reception stopping manipulation different from normal manipulation for locking or unlocking the door is made on the manipulation device in the full power mode.

3. The wireless key according to claim 2, wherein:
    the reception stopping manipulation is determined to be larger in a manipulation load on a user than the normal manipulation.

4. The wireless key according to claim 3, wherein:
    the reception stopping manipulation is determined as a patterned manipulation that combines a period of time during which the manipulating state of the manipulation device is continued with a period of time during which the manipulating state is released according to a predetermined pattern, and
    the mode changeover means stops the reception of the polling radio wave receiver circuit and shifts the operation mode to the power saving mode based on a result of checking the manipulation pattern that is input from the manipulation device with a master pattern that is pre-stored.

5. The wireless key according to claim 3, wherein:
    the manipulation device includes a plurality of manipulation units; and
    the reception stopping operation is determined as a combination of manipulation made on the plurality of manipulation units.

6. The wireless key according to claim 5, wherein the mode changeover means includes:
    an operation mode setting information storage unit that is a nonvolatile memory which rewritably stores operation mode setting information indicative of operation mode setting contents of the polling radio wave receiver circuit;
    operation stop instruction signal outputting means for outputting the operation stop instruction signal to the polling radio wave receiver circuit based on storage contents of the operation mode setting information storage unit; and
    operation mode setting information rewriting means for rewriting the operation mode setting information of the operation mode setting information storage unit upon transfer of the reception stopping signal.

7. The wireless key according to claim 6, wherein:
    the mode changeover means includes operation restart instruction signal outputting means for outputting the operation restart instruction signal to the polling radio wave receiver circuit based on the storage contents of the operation mode setting information storage unit; and
    the operation mode setting information rewriting means rewrites the operation mode setting information of the operation mode setting information storage unit upon transfer of the reception restart signal.

8. The wireless key according to claim 7, further comprising:
    operation mode setting information wireless transmitting means for transmitting the operation mode setting information of the operation mode setting information storage unit to the subject body.

9. A door remote locking and unlocking control system comprising:
    the wireless key according to claim 8;
    operation mode setting information receiving means that is disposed in the subject body for receiving the operation mode setting information from the wireless key; and operation mode notifying means for notifying the setting state of the operation mode of the wireless key based on the operation mode setting information that is received.

10. The door remote locking and unlocking control system according to claim 9, wherein:
the operation mode notifying means visually indicates the setting state of the operation mode on a vehicle meter display.

11. The wireless key according to claim 1, wherein:
the polling radio wave receiver circuit receives, in the full power mode, a reception stop signal for stopping the reception of the polling radio wave as a radio wave;
the polling radio wave receiver circuit transfers the reception stopping signal that is received to the control circuit so that the mode changeover means conducts mode changeover control that stops the operation of the polling radio wave receiver circuit upon transfer of the reception stopping signal.

12. The wireless key according to claim 11, further comprising:
a transponder circuit, provided in addition to the polling radio wave receiver circuit, for receiving the reception stop signal as the radio wave in the full power mode.

13. The wireless key according to claim 1, wherein:
the mode changeover means restarts the reception of the polling radio wave receiver circuit and shifts the operation mode to the full power mode, when a predetermined reception stopping operation different from normal operation for locking or unlocking the door with respect to the manipulation device is conducted in the power saving mode.

14. The wireless key according to claim 13, wherein:
the reception restarting operation is determined to be larger in an operation load on a user than a normal operation.

15. The wireless key according to claim 14, wherein:
the reception restarting operation is determined as a patterned manipulation that combines a period of time during which the manipulation state of the manipulation device is continued with a period of time during which the manipulation state is released according to a predetermined pattern; and
the mode changeover means restarts the reception of the polling radio wave receiving circuit and shifts the operation mode to the full power mode based on a result of checking the manipulation pattern that is input from the manipulation device with a pre-stored master pattern.

16. The wireless key according to claim 14, wherein:
the reception restarting operation is determined as a combination of manipulation made on a plurality of manipulation units of the manipulation device.

17. The wireless key according to claim 1, further comprising:
a transponder circuit provided in addition to the polling radio wave receiver circuit for receiving, in the power saving mode, a reception restart signal for restarting the operation of the polling radio wave receiving circuit;
wherein the transponder circuit transfers the reception restart signal that is received to the control circuit with an induced electromotive force of the transponder as a power supply; and
wherein the mode changeover means conducts control for restarting the operation of the polling radio wave receiver circuit upon transfer of the reception restart signal.

18. The wireless key according to claim 1, wherein:
the subject body is a vehicle.

* * * * *